Figure 1:
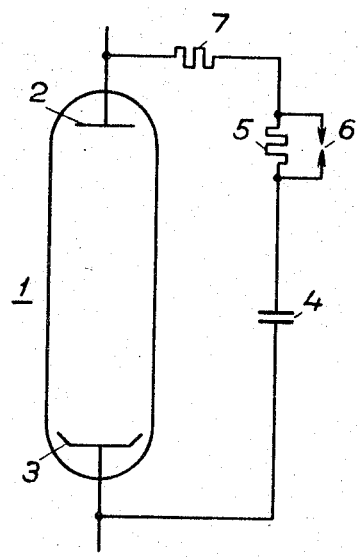

March 21, 1967

C. I. BOKSJÖ

3,310,707

OVER VOLTAGE PROTECTION MEANS FOR HIGH
VOLTAGE MERCURY ARC RECTIFIERS

Filed April 20, 1964

INVENTOR.
CARL INGVAR BOKSJÖ

BY Bailey, Stephens &
Huettig 3,310,707
OVER VOLTAGE PROTECTION MEANS
FOR HIGH VOLTAGE MERCURY ARC
RECTIFIERS
Carl Ingvar Boksjö, Vasteras, Sweden, assignor to Allmanna Svenska Elektriska Aktiebolaget, Vasteras, Sweden, a corporation of Sweden
Filed Apr. 20, 1964, Ser. No. 361,191
Claims priority, application Sweden, May 16, 1963, 5,412/63
4 Claims. (Cl. 315—123)

The present invention relates to an over-voltage protection means for high voltage mercury arc rectifiers in order to limit the over-voltages which could be generated during so-called quenchings in mercury arc rectifiers and to take care of over-voltages with high derivatives which reach the rectifier from outside. With the help of such an over-voltage protection means it is possible to decrease the risk of total flash-over on the outside of the rectifier, which would cause dangerous short-circuiting currents.

For the discharging of over-voltages which are generated during quenchings or rapid voltage changes from outside, it is known to arrange, in connection with a voltage divider connected to intermediate electrodes in the rectifier, voltage-dependent resistors, so-called varistors, parallel-connected with a spark gap and inserted between the conductors between the intermediate electrodes and the voltage divider. Such an over-voltage protection means however, when it comes into operation, causes the anode and cathode of the rectifier to be short-circuited, whereby dangerous short-circuiting currents could arise. According to the invention such short-circuits are avoided by storing in a capacitor the power of the over-voltages. From an oscillation point of view it is however unsuitable normally to have an almost undamped capacitor connected over a rectifier, and therefore according to the invention it is proposed to construct the over-voltage protection means by inserting a capacitor between the anode and cathode of the rectifier, in series with a resistor which in its turn is parallel-connected with a spark-gap. Said resistor will under normal conditions function as a damping resistance for the capacittor, and the spark-gap is so dimensioned that it does not ignite at normal 50 cycles per second switching over-voltages caused by normal operation. Under rapid over-voltage conditions, such as those depending on quenchings in the mercury arc rectifier or rapid over-voltages from outside, the spark-gap will on the other hand ignite and short-circuit the damping resistor, so that all the energy of the over-voltage is stored in the capacitor. In order to decrease the capacitor stresses it may be desirable to insert a further resistor in series with the capacitor. This resistor will thus be connected also when the spark gap is conducting and gives thereby a certain damping of the capacitor current. This resistor should be low-ohmic in comparison with the first resistor and its resistance should therefore be at least one order of magnitude less than the first resistance.

According to a further development of the invention the protective means may suitably be made as a voltage divided for a number of intermediate electrodes in the mercury arc rectifier, which voltage divider comprises a number of series-connected capacitors and resistances, the different resistances in the voltage divider being each parallel-connected with a spark-gap. The principle is the same as according to the above-described embodiment, namely that over-voltages with high derivatives will ignite the spark-gap, the over-voltages being then stored in the capacitors in a substantially capacitive connection between the anode and cathode of the rectifier. During normal voltage conditions the spark-gaps will be inactive and the voltage divider functions as a normal voltage divider.

Figure 2:
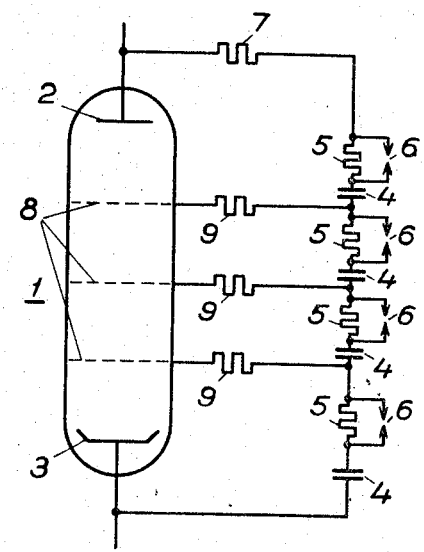

The invention will otherwise be further described with reference to the accompanying drawing, where FIGURE 1 shows an over-voltage protection means according to the basic idea of the invention, while FIGURE 2 shows how a voltage divider for the mercury arc rectifier can be made as an over-voltage protection means by connecting its resistive parts in parallel with spark-gaps.

FIGURE 1 shows a mercury arc rectifier 1 provided with an anode 2 and a cathode 3. Between the anode and cathode an over-voltage protection means comprising a capacitor 4 is connected in series with a resistor 5. This resistor is parallel-connected with a spark-gap 6. Under normal voltage conditions and also at 50 cycles per second switching over-voltages, which may be obtained in normal operation, the spark-gap 6 is inactive and the resistor 5 will work as a powerful damping resistance for the capacitor 4. The spark-gap 6 first ignites at over-voltages with high derivatives, whereupon the energy in the over-voltages is stored in the capacitor 4. In order to damp the oscillations in the capacitor current and thereby decrease the stresses on the capacitor, a resistor 7 is connected in series with the protective means. This resistor must be low-ohmic in relation to the resistor 5 and its resistance should therefore be at least one order of magnitude less than the resistance of 5.

FIGURE 2 shows a similar mercury arc rectifier 1 with anode 2 and cathode 3 and a number of intermediate electrodes 8 connected across series resistors 9 to a voltage divider consisting of a number of series-connected capacitors 4 and resistors 5. To make use of this voltage divider as over-voltage protection means according to the invention its resistors 5 are each parallel-connected with a spark-gap 6. These spark-gaps are dimensioned so that with over-voltages of the kind discussed here they will ignite, whereby the voltage divider will form a substantially capacitive connection between the anode and cathode of the rectifier, whereby the energy from the over-voltages will be stored in the capacitors 4. In this case also it may be suitable to connect in a series resistor 7 as is shown.

What is claimed is:
1. In an operating circuit network for a mercury arc rectifier, having a plurality of electrodes defining at least anode and cathode, an individual over-voltage protection means directly connected across at least two of said plurality of electrodes; said individual over-voltage protecting means comprising: a capacitor and a first damping resistor connected in series circuit; and spark gap means connected directly across said first damping resistor; said spark gap means being responsive to a predetermined level of over-voltage to effect spark-over thereby shunting said first damping resistor; said predetermined level of over-voltage exceeding voltage levels applied to said mercury arc rectifier by said operating circuit network during normal operation thereof.

2. The invention as claimed in claim 1, including a second damping resistor connected in series circuit with said first damping resistor and said capacitor; the resistance of said second damping resistor being at least one order of magnitude less than that of said first damping resistor.

3. The invention as claimed in claim 2, in which said over-voltage protection means is directly connected across the anode and cathode electrodes.

4. The invention as claimed in claim 2, in which said plurality of electrodes include intermediate electrodes between the anode and cathode electrodes of said mercury arc rectifiers; an individual over-voltage protection means directly connected across at least some of said intermediate electrodes; said capacitors and said first damping resistors of said individual over-voltage protection means forming voltage divider means for said intermediate electrodes.

References Cited by the Examiner
UNITED STATES PATENTS

| | | | |
|---|---|---|---|
| 2,145,727 | 1/1939 | Lloyd | 315—53 |
| 3,035,204 | 5/1962 | Dillon | 315—264 |

JOHN W. HUCKERT, *Primary Examiner.*

D. O. KRAFT, *Assistant Examiner.*